(12) United States Patent
Armstrong et al.

(10) Patent No.: US 12,531,858 B2
(45) Date of Patent: Jan. 20, 2026

(54) PROTECTING CONTROLLER AREA NETWORK (CAN) MESSAGES IN AUTONOMOUS SYSTEMS AND APPLICATIONS

(71) Applicant: NVIDIA CORPORATION, Santa Clara, CA (US)

(72) Inventors: William Joseph Armstrong, Rochester, MN (US); Chao-Lin Chiu, New Taipei (TW); Mihir Joshi, Santa Clara, CA (US); Nikesh Oswal, Pune (IN); Mark Alan Overby, Snohomish, WA (US); Hyung Taek Ryoo, Pleasanton, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 167 days.

(21) Appl. No.: 18/486,988

(22) Filed: Oct. 13, 2023

(65) Prior Publication Data

US 2025/0112920 A1    Apr. 3, 2025

(30) Foreign Application Priority Data

Sep. 28, 2023   (IN) .............................. 202341065265

(51) Int. Cl.
*H04L 9/40* (2022.01)
*H04L 12/40* (2006.01)

(52) U.S. Cl.
CPC .......... *H04L 63/0876* (2013.01); *H04L 12/40* (2013.01); *H04L 2012/40215* (2013.01); *H04L 2012/40273* (2013.01)

(58) Field of Classification Search
CPC .................. H04L 63/0876; H04L 2012/40273
See application file for complete search history.

(56) References Cited

U.S. PATENT DOCUMENTS

| RE44,697 E  * | 1/2014 | Jones ..................... G06F 7/5052 |
| | | 713/193 |
| 11,818,235 B1 * | 11/2023 | Teshler ................... H04L 45/72 |
| 2003/0223580 A1 * | 12/2003 | Snell ....................... H04L 9/003 |
| | | 380/28 |
| 2015/0293968 A1 * | 10/2015 | Dickie .................. G06F 16/244 |
| | | 707/738 |
| 2018/0183605 A1 * | 6/2018 | Kawabata ............. H04L 9/0819 |
| 2021/0209231 A1 * | 7/2021 | Weigand ................... G06F 8/65 |
| 2021/0406380 A1 * | 12/2021 | Poulard ................... G06F 21/74 |

(Continued)

*Primary Examiner* — Hieu T Hoang
(74) *Attorney, Agent, or Firm* — Squire Patton Boggs LLP; Sarah Mirza

(57) ABSTRACT

In various examples, a technique for securely transmitting CAN (Controller Area Network) messages is disclosed that includes receiving, using a cryptographic engine, a message from an application to be transmitted over a CAN (Controller Area Network) bus, wherein the cryptographic engine executes a secure firmware and is implemented on an on-die discrete processor. The technique further includes accessing, using the secure firmware, a key from a plurality of keys associated with an authentication process from a secure memory associated with the cryptographic engine. Additionally, the technique includes computing an authentication tag using the key and the message and transmitting the message with the authentication tag over the CAN bus to a destination address.

19 Claims, 10 Drawing Sheets

(56) References Cited

U.S. PATENT DOCUMENTS

| | | | |
|---|---|---|---|
| 2021/0406381 A1* | 12/2021 | Heisrath | H04L 63/123 |
| 2022/0207192 A1* | 6/2022 | Heo | G06F 21/602 |
| 2022/0365788 A1* | 11/2022 | Koo | G06F 9/4401 |
| 2023/0073566 A1* | 3/2023 | Sivasithambaresan | H04L 67/12 |
| 2023/0075593 A1* | 3/2023 | Miyauchi | H04W 12/06 |
| 2024/0048388 A1* | 2/2024 | Yamada | H04L 9/3234 |

* cited by examiner

PROTECTING CONTROLLER AREA NETWORK (CAN) MESSAGES IN AUTONOMOUS SYSTEMS AND APPLICATIONS

CROSS-REFERENCE TO RELATED APPLICATIONS

This application claims priority benefit of Indian patent application titled, "A REAL-TIME, SAFE, AND SECURE METHOD TO PROTECT CAN MESSAGES IN A VEHICLE," filed on Sep. 28, 2023, and having Serial No. 202341065265. The subject matter of this related application is hereby incorporated herein by reference.

BACKGROUND

CAN (Controller Area Network) messages serve as a prevalent communication protocol in automotive and industrial domains, facilitating real-time data exchange among electronic control units (ECUs). CAN messaging, for example, provides an efficient means of transmitting data and commands between different systems, modules, or sensors in the vehicle. Comprising an identifier, data payload, and additional control bits, these messages are efficiently transmitted over a two-wire bus (the CAN bus), enabling seamless communication across multiple ECUs within a network. In a CAN network, ECUs (Electronic Control Units) are responsible for controlling specific functions and subsystems within a vehicle. Each ECU is designed to perform a specific task and communicates with other ECUs through the CAN bus.

The CAN bus system enables each ECU in a vehicle to communicate with all the other ECUs without complex dedicated wiring. Specifically, an ECU can prepare and broadcast information (e.g., sensor data) via the CAN bus (typically comprising two wires, CAN low and CAN high). The broadcast data is accepted by all other ECUs on the CAN network, and each ECU can then check the data and decide whether to receive or ignore it. ECUs can receive input signals from sensors, process the data, and send commands to actuators to perform specific actions. ECUs also monitor certain system parameters and ensure optimal operation. ECUs also exchange commands with other ECUs through the CAN bus. They transmit and receive messages to coordinate actions, share data, and synchronize operations between different systems.

CAN messaging is used for numerous applications including vehicle control, transmission of sensor data throughout the vehicle, diagnostic and fault handling, infotainment and communication, and vehicle body electronics. For example, CAN messaging may allow communication between ECUs responsible for controlling various vehicle systems, including, but not limited to, engine management, transmission, braking, steering, power windows, central locking, lighting systems, climate control, and suspension. More specifically, ECUs, may collect and communicate messages from one or more sensors, including, but not limited to, the ignition switch, a throttle position sensor, a vehicle speed sensor, an air temperature sensor, an engine temperature sensor, a crank position sensor, a fuel pressure sensor and a battery voltage. The data collected from the sensors can be processed by the ECUs and commands can be transmitted out to one or more actuators including, but not limited to, an ignition circuit or spark plugs, the throttle control, injectors, O2 sensor heaters, on-board diagnostics, a fuel pump, a radiator fan and an alternator. Each ECU may receive one or more sensor input messages and perform a specific function associated with an actuator in response to the signals received from the sensor input messages.

Securing CAN messages in a vehicle is of utmost importance due to the critical role the CAN bus plays in the operation of modern vehicles. CAN messages often contain instructions and data that control various systems, including the engine, brakes, steering, and more. Therefore, securing CAN messages helps protect against unauthorized access, data manipulation, and message spoofing, ensuring the trustworthiness and reliability of the vehicle's systems. It safeguards the vehicle and its occupants from potential cyber threats, enabling a safe and secure driving experience.

Allowing the security of CAN message communication in automotive and industrial domains has been a challenging task due to the requirement for real-time or near real-time relay and the potential computational burden associated with incorporating authentication tags or encryption on CAN packets. Certain generalized systems are able to provide secure communication over CAN networks, however, they typically require the use of specialized hardware and/or reconfiguring the CAN bus (or protocol), which can be a costly and time-consuming endeavor.

Therefore, there is a need for more efficient techniques to enhance the security of CAN message communication without altering the CAN protocol or requiring the use of specialized hardware.

SUMMARY

Embodiments of the present disclosure relate to a real-time or near real-time secure solution for protecting Controller Area Network (CAN) messages in autonomous or semi-autonomous vehicle or machine applications. The techniques described herein include receiving, using a cryptographic engine implemented on an electronic control unit (ECU), a message from an application to be transmitted over a CAN bus. The techniques also include accessing one or more keys from a secure memory associated with the cryptographic engine and computing an authentication tag using the one or more keys. The techniques further include transmitting the message with the authentication tag over the CAN bus to a destination address, where the authentication tag is used to confirm that the message has not changed during the transmission.

One technical advantage of the disclosed techniques relative to prior solutions is the ability to secure communication on a CAN bus network without requiring specialized hardware or needing to rewire or alter the CAN bus protocol in any fashion. Accordingly, the disclosed techniques are less resource-intensive than prior art approaches to secure communication. Another technical advantage of the disclosed techniques is the capability to prioritize and process high-priority messages ahead of lower-priority ones. This prioritization allows safety-critical applications to receive precedence over other messages, ensuring their timely and reliable delivery. Consequently, the disclosed techniques allow for intelligent triaging capabilities by effectively managing and prioritizing between different message types. Another technical advantage of the disclosed techniques is the ability to enhance security by using a dedicated security processor and associated memory for managing keys and computing authentication tags. This dedicated processor and memory ensure robust security measures, effectively safeguarding the CAN messaging network from potential hijacking or unauthorized access.

BRIEF DESCRIPTION OF THE DRAWINGS

The present systems and methods for protecting Controller Area Network (CAN) messages in autonomous or semi-autonomous systems and applications are described in detail below with reference to the attached drawing figures, wherein.

DETAILED DESCRIPTION

Figure 1:
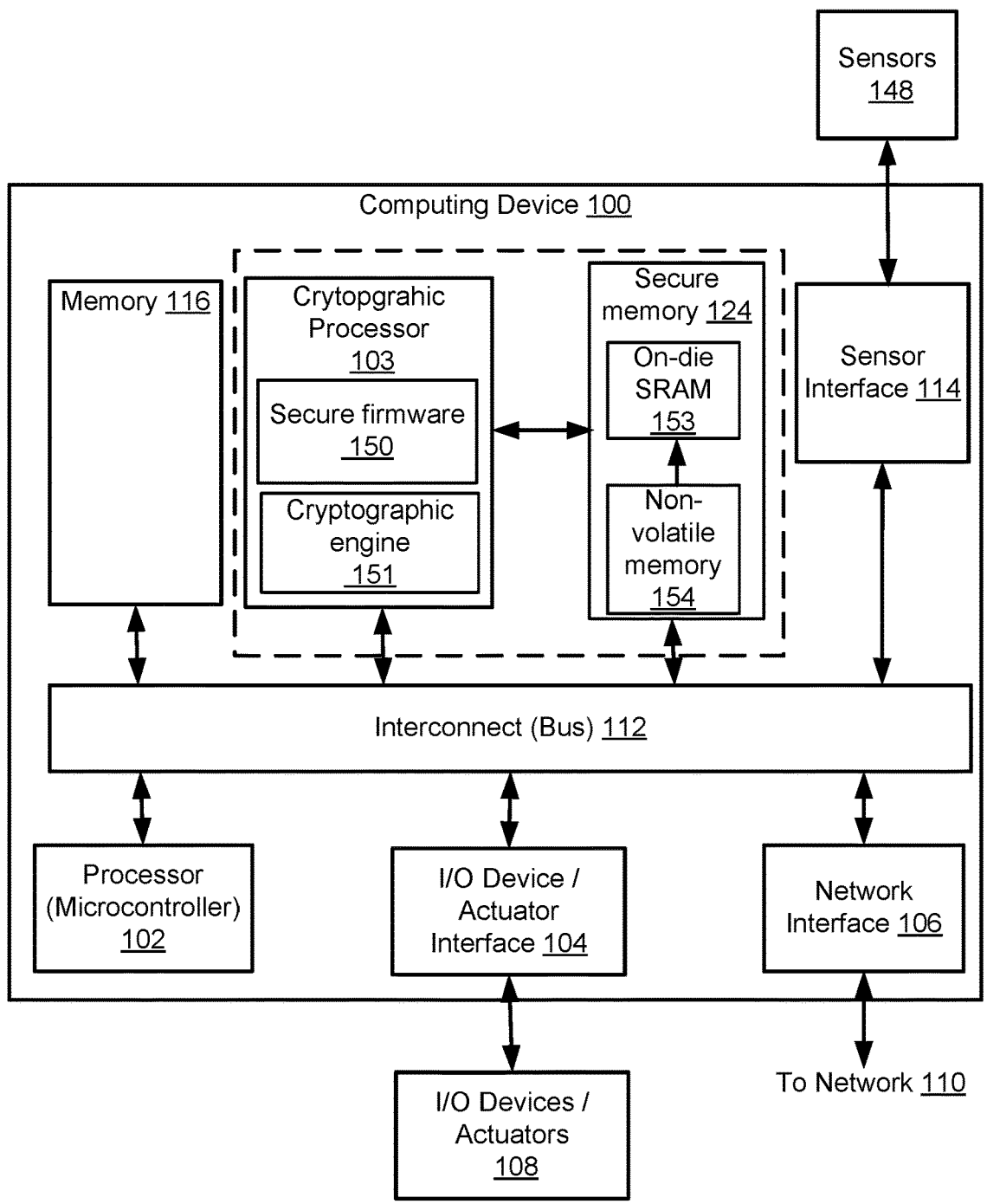
FIG. 1 illustrates a computing device configured to implement one or more aspects of various embodiments.

Systems and methods are disclosed related to a real-time or near real-time secure solution for protecting Controller Area Network (CAN) messages in autonomous or semi-autonomous systems and applications. Although the present disclosure may be described with respect to an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to protecting Controller Area Network (CAN) messages in vehicles or other machine types, this is not intended to be limiting, and the systems and methods described herein may be used in augmented reality, virtual reality, mixed reality, robotics, security and surveillance, autonomous or semi-autonomous machine applications, and/or any other technology spaces where Controller Area Network (CAN) messages may be used.

As discussed herein, the current state of generalized systems falls short in providing a practical solution for securing CAN message communication in vehicles without resorting to complex protocol modifications or expensive specialized hardware. Consequently, there is a need for more streamlined and cost-effective techniques that can bolster the security of CAN message communication without imposing changes to the existing CAN protocol or necessitating the adoption of costly specialized hardware.

To improve the security of message communication in a CAN network, the disclosed techniques offer real-time or near real-time cryptographic authentication tags on CAN messages computed using, in embodiments, hardware accelerators configured on a cryptographic engine. Securing CAN message communication may further include integrating a dedicated on-die processor on each electronic control unit (ECU), distinct from the microcontroller responsible for software execution and sensor input processing. The dedicated processor may be equipped with the cryptographic engine, which is specifically designed for computing the authentication tags (also referred to herein as message authentication codes (or MACs)), thereby, providing efficient and robust security measures. The dedicated discrete processor is equipped with its own boot software that initiates a secure state upon bootup by loading an authenticated secure firmware. In embodiments, the cryptographic keys associated with the authentication tags are securely managed within an on-die SRAM on each ECU, which is in communication with the on-die discrete processor. Upon entering the secure state, the cryptographic engine computes the authentication tags by using the keys from the on-die SRAM that are transferred over to the authenticated secure firmware.

In accordance with the disclosed techniques, an ECU transmitting a message (or portion of a message) onto the CAN bus computes an authentication tag for the message (or portion of the message) using an authentication process, for example, a message authentication code (MAC) process. A MAC algorithm is a symmetric key cryptographic technique to provide message authentication. For establishing a MAC process, the sender and receiver entity share a symmetric key. It should be noted that the type of authentication process used is not limited and that many different types of authentication processes or algorithms can be used including, but not limited to, HMAC (Hash-based MAC), KMAC (Keccak-based MAC), CMAC (Cipher-based MAC), etc. The authentication tag can be calculated by the cryptographic engine using one or more of the keys stored in the on-die SRAM, which are transferred to the secure firmware upon initialization or system bootup.

After transmission, the message and its corresponding authentication tag are received by the designated ECU. Upon receipt, the receiving ECU initiates the authentication process by feeding the received message and the shared key into the authentication algorithm (e.g., MAC). The authentication algorithm recomputes the authentication tag based on these inputs. Subsequently, the receiving ECU compares the newly computed authentication tag with the one received from the transmitting ECU to verify their equality. If the tags match, the receiving ECU confirms the authenticity of the message and accepts the message as originating from the intended sender. In the event that the computed authentication tag does not align with the received tag, the receiver is unable to determine whether the message has been falsified.

To prioritize performance-critical workloads, the secure firmware receives workloads from multiple software queues with different levels of priority, such as high and low priority queues in the case of two software queues. Applications are responsible for assigning their respective workloads to the appropriate queue before initiating a cryptographic authentication tag calculation. The secure firmware then processes the queues in a prioritized fashion, starting with the higher priority queue and sequentially moving to the lower priority queue, providing efficient and timely execution of critical tasks.

To avoid lower priority queue workloads from stalling higher priority work, a quantization technique is employed by the secure firmware where low priority messages above a certain threshold size are split into smaller quantum operations of fixed sizes or smaller message packet. The threshold size is configurable. After operating on each quantum operation (or "discrete message packet") associated with low priority work, the firmware is configured to perform a check to determine if higher priority workload is available for processing. If higher priority work is present, the higher priority work is completed before returning to the previous operation associated with the next discrete message packet associated with lower priority work. This bounds the amount of time the firmware spends operating on a low priority request and avoids interference with high priority requests.

FIG. 1 illustrates a computing device 100 configured to implement one or more aspects of various embodiments. In at least one embodiment, computing device 100 includes an electronic control unit (ECU) of a vehicle system, a desktop or laptop computer, a smart phone, a personal digital assistant (PDA), a tablet computer, a server, one or more virtual machines, an embedded system, a system on a chip, a computing system of an autonomous, semi-autonomous, or a non-autonomous machine, and/or any other type of computing device configured to receive input, process data, and is suitable for practicing one or more embodiments. Note that computing device 100 may also be implemented similar to that of the computing device of the example autonomous or semi-autonomous machine 500 described at least with respect to FIGS. 5A-5D.

In some embodiments, computing device 100 comprises at least an on-die discrete cryptographic processor 103 and an associated secure memory 124. The on-die discrete processor may be separate from the main microcontroller (e.g., microcontroller or processor 102) responsible for software execution and sensor input processing. The on-die cryptographic processor 103 comprises a cryptographic engine 151 and executes secure firmware 150.

The cryptographic engine 151 may include a hardware component within the on-die discrete processor 103 that is specifically designed to perform cryptographic operations efficiently. The cryptographic engine 151 provides the necessary computational capabilities for tasks such as the computation of authentication tags. The secure firmware 150 may include a software component that executes on the on-die discrete processor 103. The secure firmware 150 can comprise software responsible for managing the security functions and protocols of the system. This includes tasks such as managing cryptographic keys, controlling access to sensitive resources, handling authentication processes, and ensuring the overall security of the system. While the cryptographic engine 151 provides the underlying hardware support for cryptographic operations, the secure firmware utilizes this engine to execute security-related tasks.

The secure firmware 150 may enhance the security features or capabilities of the computing device 100, which, as mentioned previously, can be an ECU. The secure firmware 150 typically focuses on preventing unauthorized access, and ensuring the integrity of data. Secure firmware 150 can include cryptographic algorithms, authentication protocols, and/or other security-related functionalities and may be responsible for implementing security measures at the firmware level to safeguard the device against potential threats, attacks, and/or vulnerabilities. The secure firmware 150 works in conjunction with other security components, such as hardware security modules or dedicated security modules (e.g., cryptographic engine 151), to provide robust protection and enforce security policies. The secure firmware 150 may interact with the cryptographic engine 151 to request cryptographic operations, provide necessary inputs (such as keys), and process the results. It should be noted that while represented as separate components in FIG. 1, the secure firmware 150 and the cryptographic engine 151 can have overlapping functionality and/or can be integrated within a single module.

In some embodiments, the cryptographic processor 103 uses the PKCS #11 (Public Key Cryptography Standard #11) standard for providing authentication functionality. PKCS #11 is a widely used cryptographic interface standard that defines a platform-independent API (Application Programming Interface) for cryptographic hardware devices, such as smart cards and hardware security modules. It provides a standardized way to access cryptographic functions and operations, including key management, encryption, decryption, digital signatures, and secure storage. PKCS #11 is commonly used in applications that require secure cryptographic operations, such as digital certificates, secure authentication, and data protection.

In some embodiments, the cryptographic processor 103 comprises dedicated boot software (not shown in FIG. 1) that initiates a secure state upon bootup by loading an authenticated secure firmware 150. In some embodiments, the cryptographic processor 103 comprises a dedicated and non-modifiable memory region (referred to herein as "boot read only memory (ROM)") that stores the initial boot code associated with the secure firmware 150. The boot ROM may contain a portion of code known as the boot loader or bootstrap code that is responsible for initializing the processor, performing essential system checks, and loading the secure firmware 150 into the secure memory 124 and, in particular, into an active region of the on-die SRAM 151 during system boot-up or initialization to facilitate its execution. Having a dedicated boot ROM for the secure firmware 150 provides several advantages for the cryptographic processor 103. The boot ROM contains trusted and unchangeable code, which ensures the integrity and authenticity of the boot process. The boot ROM helps prevent unauthorized modifications to the boot code, protecting the system against malicious attacks. Further, since the boot ROM is separate from other memory regions, it provides a reliable and consistent source for the boot code. It eliminates the risk of accidental corruption or alteration of the boot code. Also, the cryptographic processor 103 can start executing the boot code immediately after power-on, without the need for external storage or intervention. This allows for a faster and more automated boot process. Overall, the presence of a dedicated boot ROM for loading the secure firmware 150 in the cryptographic processor 103 enhances the security, reliability, and efficiency of the boot process by providing a trusted and immutable source for the initial firmware execution.

In some embodiments, the cryptographic engine 151 comprises hardware accelerators to compute cryptographic authentication tags. Hardware accelerators are specialized components integrated into cryptographic processors to enhance their performance and efficiency in computing cryptographic operations, such as computing authentication tags. These accelerators are designed to offload the computational burden from the main processing functions and provide dedicated hardware support for cryptographic algorithms. Cryptographic operations involve complex mathematical calculations that can be time-consuming and resource-intensive. Hardware accelerators are purpose-built components that leverage hardware optimizations to accelerate these cryptographic computations, resulting in faster processing and improved overall system performance. Hardware accelerators can be specifically tailored for different cryptographic algorithms, such as hashing and message authentication codes (MACs). They are implemented using techniques like pipelining, parallel processing, and dedicated circuitry to efficiently execute cryptographic operations in hardware.

In relation to computing authentication tags, hardware accelerators within cryptographic processors can significantly speed up the process. The hardware accelerators can efficiently perform operations like key generation, data transformation, hashing, and other cryptographic primitives required to compute the authentication tags. By offloading these tasks to dedicated hardware, the overall processing time is reduced, allowing for real-time or near real-time generation and verification of authentication tags in applications such as secure communication protocols. By using hardware accelerators, the cryptographic processor 103 can handle high volumes of cryptographic computations with improved efficiency and reduced power consumption.

In various implementations, the on-die secure memory 124 can comprise an on-die SRAM 153 and a secure non-volatile memory 154 for storing keys associated with the authentication process. As noted above, in some embodiments, following boot up, the secure firmware 150 is loaded into the secure memory 124 and, in particular, into the on-die SRAM 153. This SRAM 153 is not accessible from outside the boundary of the SRAM, meaning that external entities or processes cannot directly access or modify the contents of this memory. The on-die SRAM is likely used by the processor for storing sensitive data, for managing and storing cryptographic keys that are loaded into the SRAM following boot up, or temporary variables needed during its operation.

In some embodiments, the secure memory 124 also comprises non-volatile memory 154 that stores the keys that are associated with a chosen authentication process, for example, a message authentication code (MAC) process. As noted previously, the type of authentication process used is not limited and that many different types of authentication processes or algorithms can be used including, but not limited to, HMAC (Hash-based MAC), KMAC (Keccak-based MAC), CMAC (Cipher-based MAC), etc. The keys can be stored in, for example, a secure non-volatile flash storage prior to initialization. It should be noted that other types of non-volatile memory can also be used including electrically erasable programmable read-only memory (EEPROM) and one-time programmable memory (OTP memory). The trusted execution environment including the on-die SRAM 153 and the secure firmware 150 can have access to the non-volatile memory (e.g., flash storage) 154 that stores the keys.

Upon initialization or boot up, the keys can be transferred to the on-die SRAM 153. Thereafter, during the computation of the authentication tags, the keys can be transferred to an active region of the SRAM 153 being used by the secure firmware 150 for computing the tags. In some embodiments, the keys are arranged in a linear array within the SRAM 153 to avoid exposure to the rest of the system on a chip (SOC) and to perform rapid key swaps during cryptographic authentication tag calculations.

In at least one embodiment, computing device 100 includes, without limitation, an interconnect (bus) 112 that connects one or more processors 102 and 103, an input/output (I/O) device/actuator interface 104 coupled to one or more input/output (I/O) devices/actuators 108, a sensor interface 114 coupled to one or more sensors 148, memory 116, and/or a network interface 106. Where the computing device 100 is an ECU, the computing device 100 can also include analog-to-digital converters, digital-to-analog converters, power supply circuitry, a diagnostic interface and various connectors for easy integration into a vehicle's wiring harness.

Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a microcontroller, a deep learning accelerator (DLA), a parallel processing unit (PPU), a data processing unit (DPU), a vector or vision processing unit (VPU), a programmable vision accelerator (PVA), any other type of processing unit, or a combination of different processing units. In general, processor(s) 102 may include any technically feasible hardware unit capable of processing data and/or executing software applications.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, where the computing device 100 is an ECU, I/O devices 108 can comprise one or more various types of actuators including, but not limited to, for example, an ignition circuit or spark plugs, the throttle control, injectors, O2 sensor heaters, on-board diagnostics, a fuel pump, a radiator fan and an alternator in communication with the computing device 100.

In at least one embodiment, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, and/or the Internet, among others.

In one embodiment, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs or more generally software code that can be executed by processor(s) 102 and application data associated with said software programs. In some embodiments, the software programs may relate to the operation of a vehicle.

In some embodiments, the cryptographic processor 103 and the secure memory 124 can be part of a system-on-a-chip (SOC). The SOC can also include other components shown in FIG. 1, including, memory 116 and processor 102.

Figure 2:
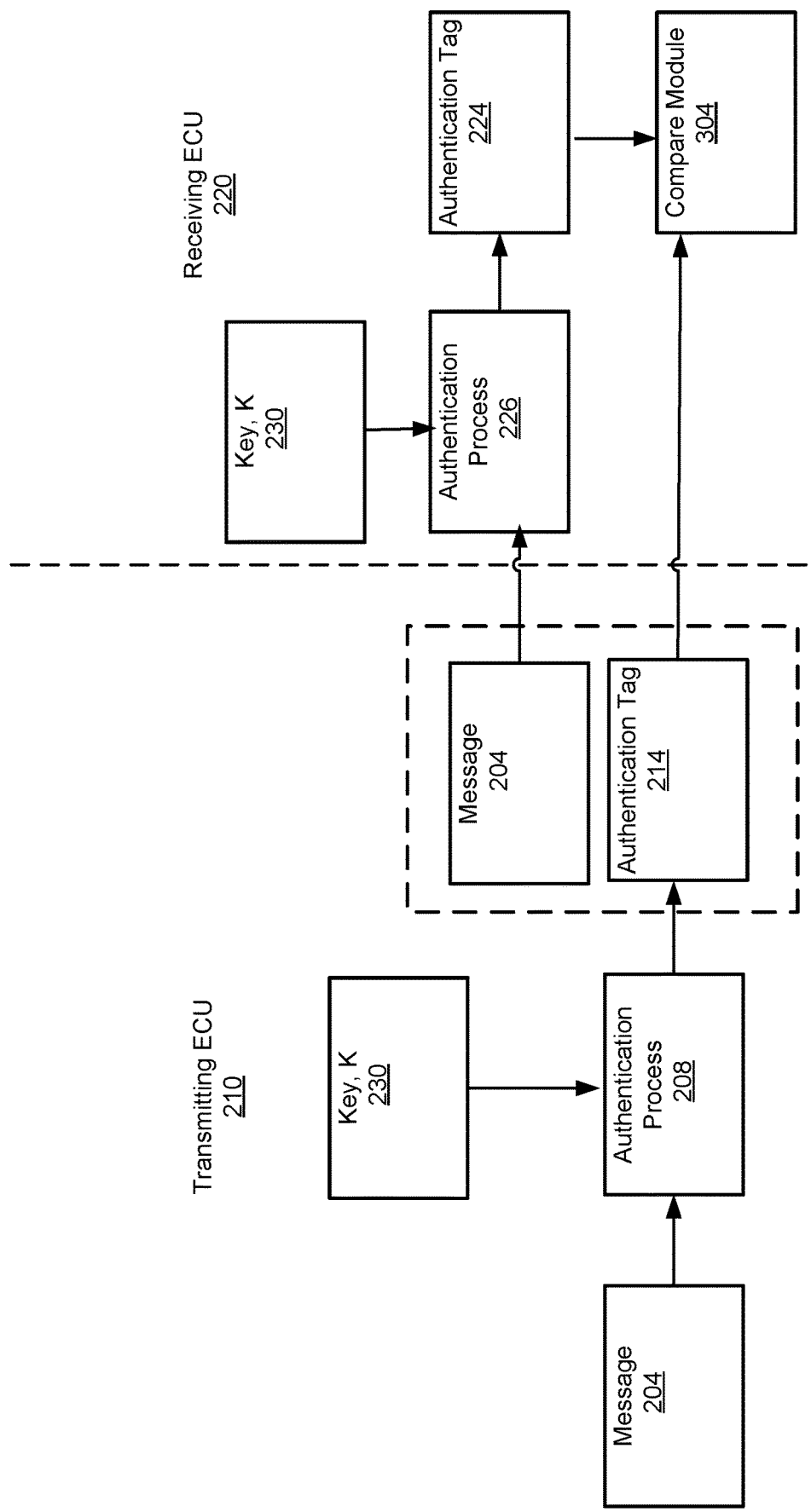
FIG. 2 is an illustration of the manner in which CAN messages are authenticated, according to various embodiments.

FIG. 2 is an illustration of the manner in which CAN messages are authenticated, according to various embodiments. In an in-vehicle CAN network, a message 204 may, for example, need to be transmitted from a transmitting ECU 210 to a receiving ECU 220. Referring to FIG. 1, the message may be associated with an application that receives sensor data (e.g., from the sensor interface 114) and, in response, actuates one of the actuators 108 through the actuator interface 104. Using a cryptographic key, K 230, an authentication process 208 is executed on the message to generate an authentication tag 214. As explained above, one of several different types of authentication processes may be used. The authentication process 208 is executed on the cryptographic engine 151 using the secure firmware 150 to compute an authentication tag 214. The authentication tag 214 can be calculated by the cryptographic engine 151 by using one or more of the keys 230 stored in the on-die SRAM 153, which are transferred to a more active region of the SRAM 153 that is being used by the secure firmware 150 during the computation of the authentication tag 214. Having computed the authentication tag 214, both the authentication tag 214 and the message 204 are transmitted to the receiving ECU 220.

After transmission, the message 204 and its corresponding authentication tag 214 are received by the receiving ECU 220. Upon receipt, the receiving ECU 220 initiates the authentication process 226 by inputting the received message 204 and the shared key K 230 (e.g., a secret key that is shared between the transmitting ECU 210 and the receiving ECU 220) into the authentication process 226. The receiving ECU 220 then recomputes an authentication tag 224 based on these inputs. Subsequently, the compare module 304 in the receiving ECU 220 compares the newly computed authentication tag 224 with the authentication tag 214 received from the transmitting ECU 210 to verify their equality. In the event that the tags match, the receiving ECU 220 confirms the authenticity of the message and accepts the message as originating from the intended sender. In the event that the computed authentication tag does not align with the received tag, the receiving ECU 220 is unable to determine whether the message has been tampered with or whether the original message has been falsified.

In some embodiments, similar to the transmitting ECU 210, the authentication tag 224 is computed by the receiving ECU 220 using a cryptographic engine 151 and secure firmware 150 similar to that discussed in connection with FIG. 1. In other words, both the transmitting ECU 210 and the receiving ECU 220 both have identical mechanisms for handling the cryptographic keys and computing the authentication tags.

Figure 3:
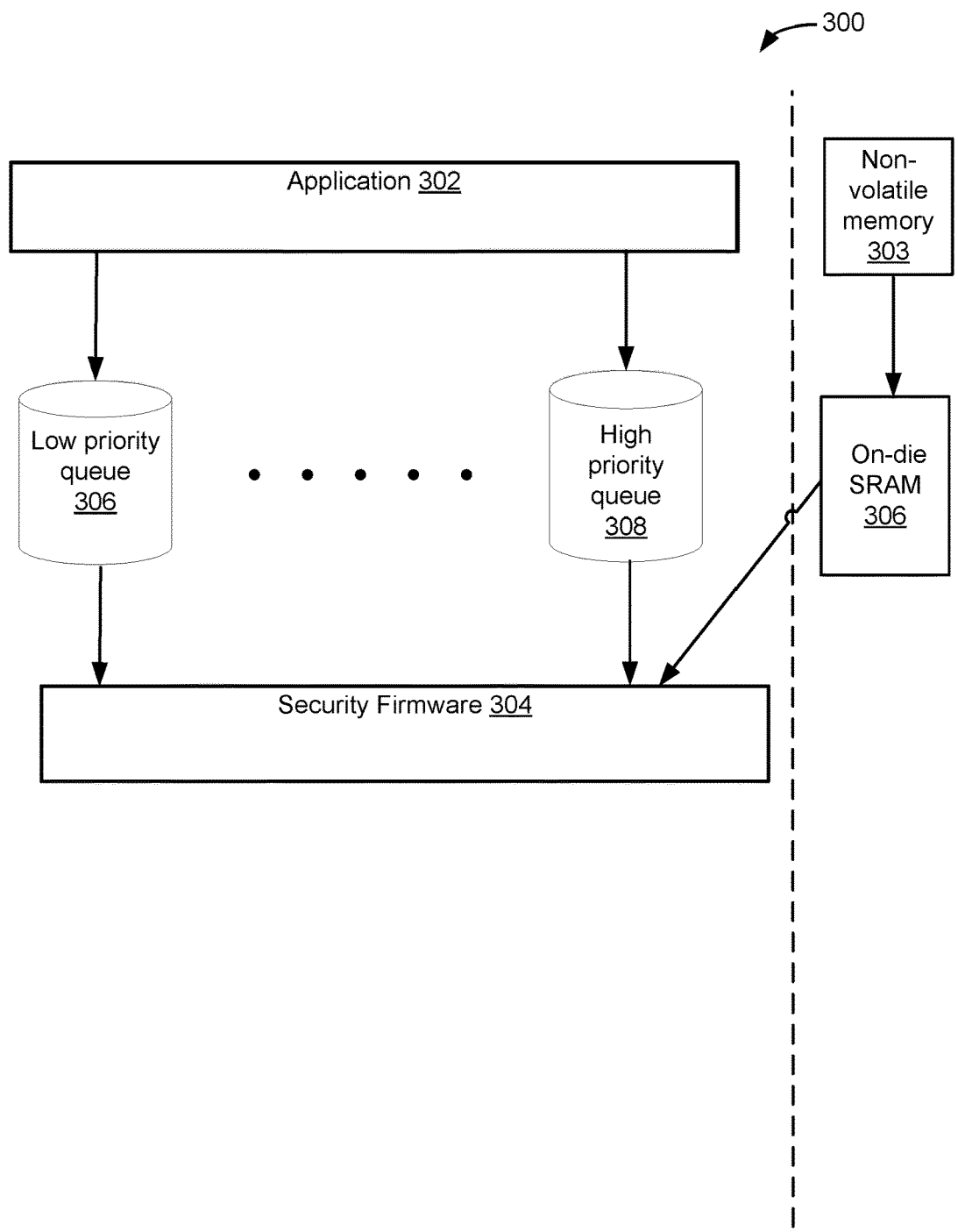
FIG. 3 is an illustration of a system for prioritizing performance critical workloads, according to various embodiments.

FIG. 3 is an illustration of a system 300 for prioritizing performance critical workloads, according to various embodiments. Allowing for proper message prioritization is crucial in a safety-critical system, where the transmission of high-priority messages through the CAN network in an in-vehicle system must not be hindered by low-priority applications. Accordingly, to prioritize performance-critical workloads, the secure firmware provides multiple software queues with different levels of priority. Note that while there can be multiple queues with multiple respective levels of priority, for the sake of simplicity, FIG. 3 only illustrates a high priority queue 308 and a low priority queue 308.

An application 302 is responsible for assigning its respective workload (or message) to an appropriate queue with a designated level of priority, e.g., a low priority queue 306 or a high priority queue 308 in the case of two software queues. The application can be associated with one or more ECUs that are part of an in-vehicle CAN network. When the application 302 receives a particular message for which an authentication tag needs to be computed, the application identifies the message as either a low priority message (associated with the low priority queue 306) or a high priority message (associated with the high priority queue 308). Depending on the priority of the message, the application 302 queues up that message into the corresponding priority queue. Priority can be assigned in various ways, such as determining it based on message size or associating each ECU with a designated level of priority, wherein any message linked to a specific ECU is automatically assigned the corresponding level of priority.

In various embodiments, applications are responsible for assigning their respective workloads to the appropriate queue before initiating a cryptographic authentication tag calculation. After a message is allocated to the appropriate queue, the secure firmware 304 processes the queues in the correct order of priority so that the messages are handled and authentication tags for the messages are computed accordingly. The secure firmware 304 processes the queues (e.g., queues 306 and 308) in a prioritized fashion, starting with the higher priority queue and sequentially moving to the lower priority queue, ensuring efficient and timely execution of critical tasks. Processing the queues comprises computing authentication tags for each of the messages that is drained from the queues by the secure firmware 304 in the correct order of priority.

To compute the authentication tags, the secure firmware 304 requires keys associated with the authentication process. As explained above, the keys are transferred on bootup from a non-volatile memory (e.g., flash memory) 303 to an on-die SRAM. The on-die SRAM can store the keys until they are needed by the secure firmware 304. When the keys are needed for computing authentication tags by the secure firmware 304, the keys are transferred from storage on the on-die SRAM to an active region of the on-die SRAM 306 where the secure firmware 304 has access to them and can compute the authentication tags using the keys.

In order to prevent lower priority workloads from impeding higher priority tasks, the secure firmware 304 may use a quantization technique. This technique may include splitting low priority messages, above a specified threshold size, into smaller units known as "discrete message packets," which, in some embodiments, may be of fixed sizes. By employing this approach, the secure firmware 304 can manage the processing of low priority messages in increments or packets, thereby avoiding potential stalls in higher priority workloads. The threshold size can be customized by the developer of the in-vehicle communication system based on the desired latency level acceptable within the system. For instance, if the typical message size is 64 kilobytes, the developer might configure the discrete message packet size to be 16 kilobytes, allowing low priority messages to be processed in 16-kilobyte increments.

After operating on each discrete message packet or unit associated with low priority work, the secure firmware 304 determines whether higher priority workload is available for processing. If higher priority work is present, then the higher priority work is completed before returning to the next message packet associated with lower priority work and continuing the processing of lower priority messages. This technique bounds the amount of time the firmware spends operating on a low priority request and avoids interference with high priority requests. The quantizing of messages to ensure that higher priority work is processed ahead of lower priority work is explained in further detail with respect to FIG. 4.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

Figure 4:
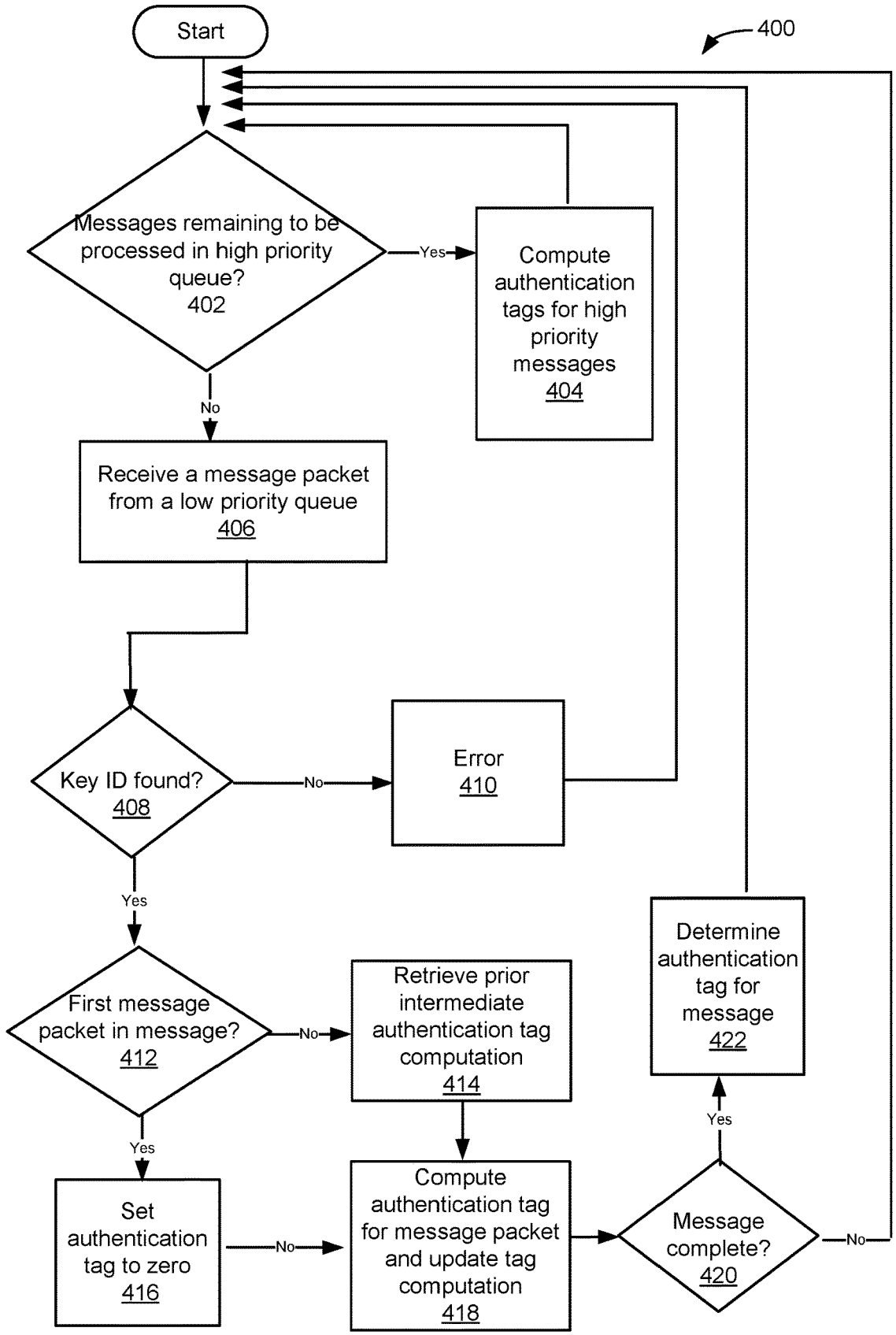
FIG. 4 illustrates a flow diagram of a method for securing Controller Area Network (CAN) messages, according to various embodiments.

Now referring to FIG. 4, each block of method 400, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 400 is described, by way of example, with respect to the system of FIGS. 1 and 3. However, this method may additionally or alternatively be executed by any one system, or any combination of systems, including, but not limited to, those described herein. Further, the operations in method 400 can be omitted, repeated, and/or performed in any order without departing from the scope of the present disclosure.

FIG. 4 illustrates a flow diagram of a method for prioritizing the secure transmission of Controller Area Network (CAN) messages, according to various embodiments. As shown in FIG. 4, method 400 begins with operation 402, in which the secure firmware 150 determines if there are any messages in the high priority queue (e.g., high priority queue 308) that need to be processed. Responsive to a determination in operation 402 that there are messages remaining in the high priority queue to be processed, in operation 404, the secure firmware 150 and the cryptographic engine 151 compute authentication tags for the high priority messages. The authentication tags (e.g., authentication tags 214, 224 etc.) can thereafter either be transmitted to a receiving ECU (e.g., receiving ECU 220) along with the corresponding messages or the authentication tags can be used to perform a verification operation at the receiving ECU.

Responsive to a determination that there are no remaining high priority messages in the high priority queue 308, in operation 406, the secure firmware 150 receives a quantized portion of a message or message packet from a low priority queue 306. The quantizing of lower priority work bounds the amount of time that the secure firmware 150 operates on a low priority request and avoids interference with high priority requests. In some embodiments, the size of the message packet (or message quanta) can be customized by the developer of the in-vehicle communication system based on the desired latency level acceptable within the system.

In some embodiments, the message packet can be prefetched while the secure firmware 150 is offloading the computation of an authentication tag for a current message packet onto the cryptographic engine 151. This reduces latency in the authentication process.

In operation 408, the secure firmware 150 attempts to match the message packet with a corresponding key using an identifier. If the appropriate key identifier is not found, then an error results in operation 410. Thereafter, the secure firmware 150 returns to operation 402 where it again determines whether messages are waiting in the high priority queue. Responsive to a determination in operation 408 that a key identifier matches the message packet, in operation 412 the secure firmware 150 determines whether the message packet is the first packet in the message.

If it is determined in operation 412 that the message packet is the first in the message, then the corresponding authentication tag is reset to zero or erased from the respective memory location (e.g., a dedicated memory location on the on-die SRAM) in operation 416. Subsequently, in operation 418, the authentication tag for the message packet is computed, and an intermediate value for the authentication tag is updated in the dedicated memory location on the on-die SRAM (e.g., on-die SRAM 306). It is important to note that since the message packet represents a portion of the complete message, the authentication tag computed in operation 418 is an intermediate value that does not yet represent the final authentication tag for the complete message.

If it is determined in operation 412 that the message packet is not the first in the message, then a prior intermediate authentication tag computed for the associated message is retrieved. Subsequently, in operation 418, the authentication tag for the message packet is computed, and the prior intermediate authentication tag retrieved from a dedicated memory location on the on-die SRAM (e.g., on-die SRAM 306) is updated.

In operation 420, the secure firmware 150 determines whether the message packet processed was the last one in the message and if the determination of the authentication tag for the respective message is complete. Referring to the example above, the secure firmware 150 would determine, for example, if all 64-kilobytes of the message have been received where the message packets are processed from the lower priority queue in 16-kilobyte increments. If it is determined in operation 420 that the message is complete, then the authentication tag for the complete message is determined. The message can then be transmitted with the authentication tag if the ECU corresponding to the secure firmware is a transmitting ECU (e.g., transmitting ECU 210), or the authentication tag can be used to perform a compare and verify operation if the ECU is a receiving ECU (e.g., receiving ECU 220). Thereafter, the secure firmware 150 can return to operation 402 where it once again determines if there are any high priority messages available in the high priority queue for transmitting.

If it is determined in operation 420 that the message is not yet complete, then the secure firmware 150 also returns to operation 402 where it once again determines if there are any high priority messages available in the high priority queue for transmitting. If no high priority messages are present, the secure firmware 150 can continue processing and computing an authentication tag for the incomplete low priority message in operation 406. By employing this approach, the secure firmware 150 can manage the processing of low priority messages in increments or packets, thereby avoiding potential stalls in higher priority workloads.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models-such as one or more large language models (LLMs), systems for performing light transport simulation, systems for performing collaborative content creation for 3D assets, systems implemented at least partially using cloud computing resources, and/or other types of systems.

Example Autonomous Vehicle

Figure 5A:
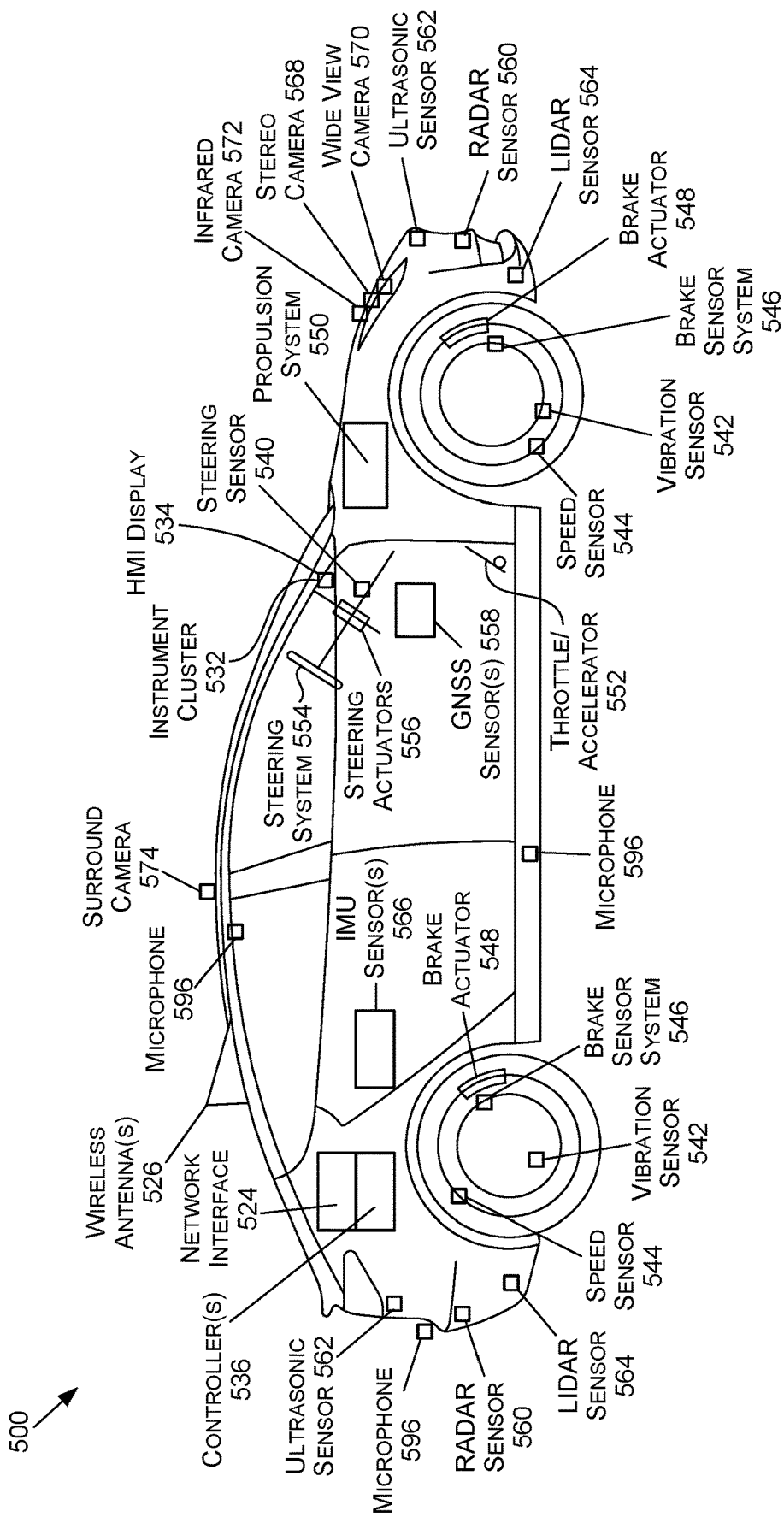
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LiDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types. The controller(s) 536 may include one or more instances of processing engine 122 and/or analysis engine 124 to monitor sensor performance based on the corresponding sensor data.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
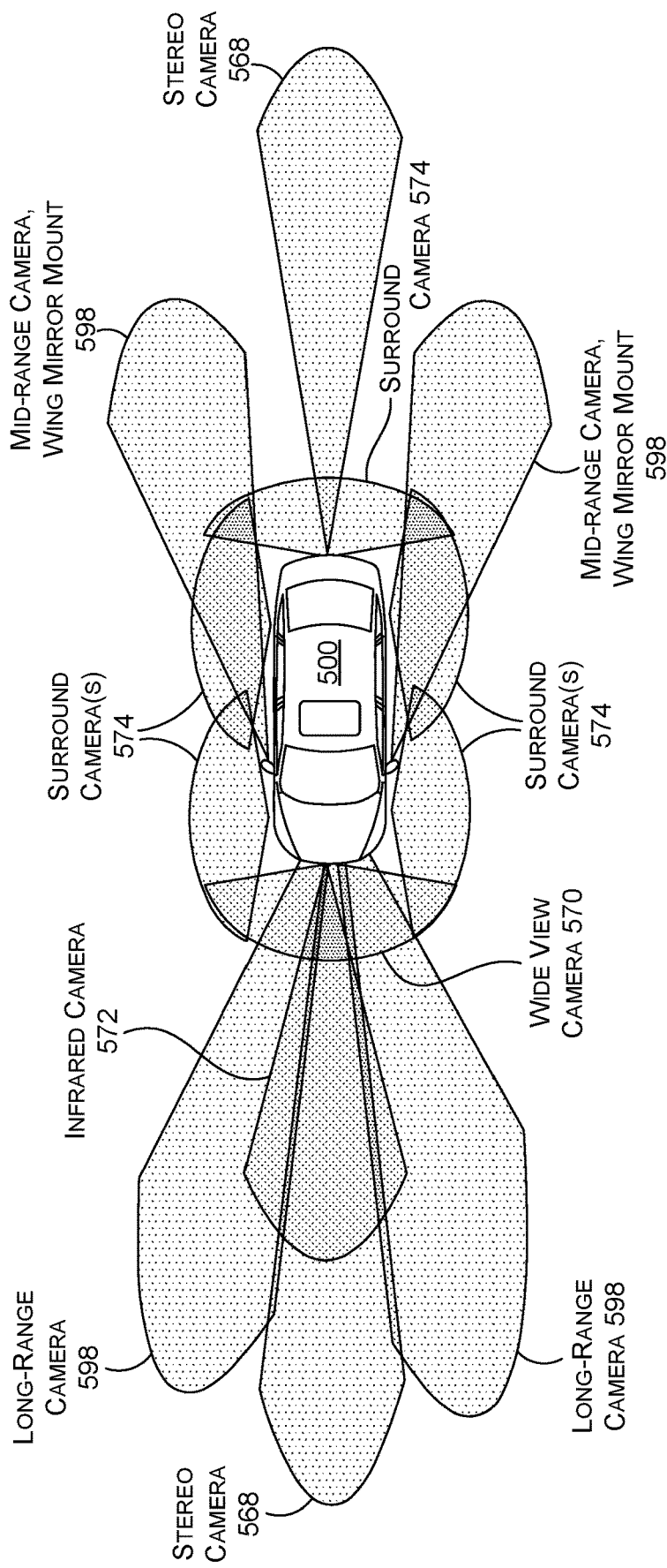
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LiDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
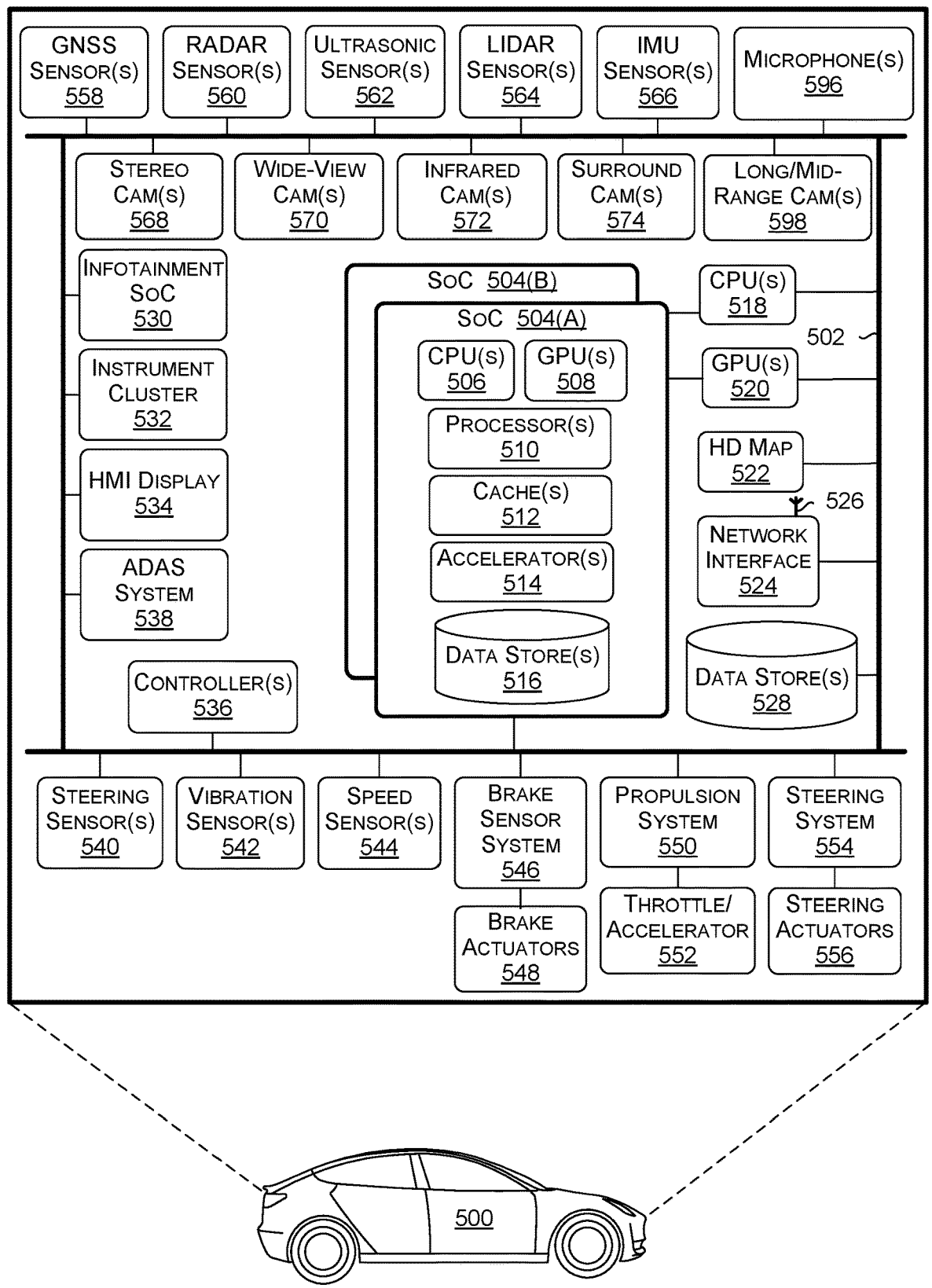
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LiDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LiDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LiDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex. The DLA may further utilize metrics associated with sensor performance as input into one or more neural networks.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LiDAR sensor(s) 564. The LiDAR sensor(s) 564 may be used for object and pedestrian detection, emergency braking, collision avoidance, and/or other functions. The LiDAR sensor(s) 564 may be functional safety level ASIL B. In some examples, the vehicle 500 may include multiple LiDAR sensors 564 (e.g., two, four, six, etc.) that may use Ethernet (e.g., to provide data to a Gigabit Ethernet switch).

In some examples, the LiDAR sensor(s) 564 may be capable of providing a list of objects and their distances for a 360-degree field of view. Commercially available LiDAR sensor(s) 564 may have an advertised range of approximately 500 m, with an accuracy of 2 cm-3 cm, and with support for a 500 Mbps Ethernet connection, for example. In some examples, one or more non-protruding LiDAR sensors 564 may be used. In such examples, the LiDAR sensor(s) 564 may be implemented as a small device that may be embedded into the front, rear, sides, and/or corners of the vehicle 500. The LiDAR sensor(s) 564, in such examples, may provide up to a 120-degree horizontal and 35-degree vertical field-of-view, with a 200 m range even for lowreflectivity objects. Front-mounted LiDAR sensor(s) 564 may be configured for a horizontal field of view between 45 degrees and 135 degrees.

In some examples, LiDAR technologies, such as 3D flash LiDAR, may also be used. 3D Flash LiDAR uses a flash of a laser as a transmission source, to illuminate vehicle surroundings up to approximately 200 m. A flash LiDAR unit includes a receptor, which records the laser pulse transit time and the reflected light on each pixel, which in turn corresponds to the range from the vehicle to the objects. Flash LiDAR may allow for highly accurate and distortion-free images of the surroundings to be generated with every laser flash. In some examples, four flash LiDAR sensors may be deployed, one at each side of the vehicle 500. Available 3D flash LiDAR systems include a solid-state 3D staring array LiDAR camera with no moving parts other than a fan (e.g., a non-scanning LiDAR device). The flash LiDAR device may use a 5 nanosecond class I (eye-safe) laser pulse per frame and may capture the reflected laser light in the form of 3D range point clouds and co-registered intensity data. By using flash LiDAR, and because flash LiDAR is a solid-state device with no moving parts, the LiDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LiDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
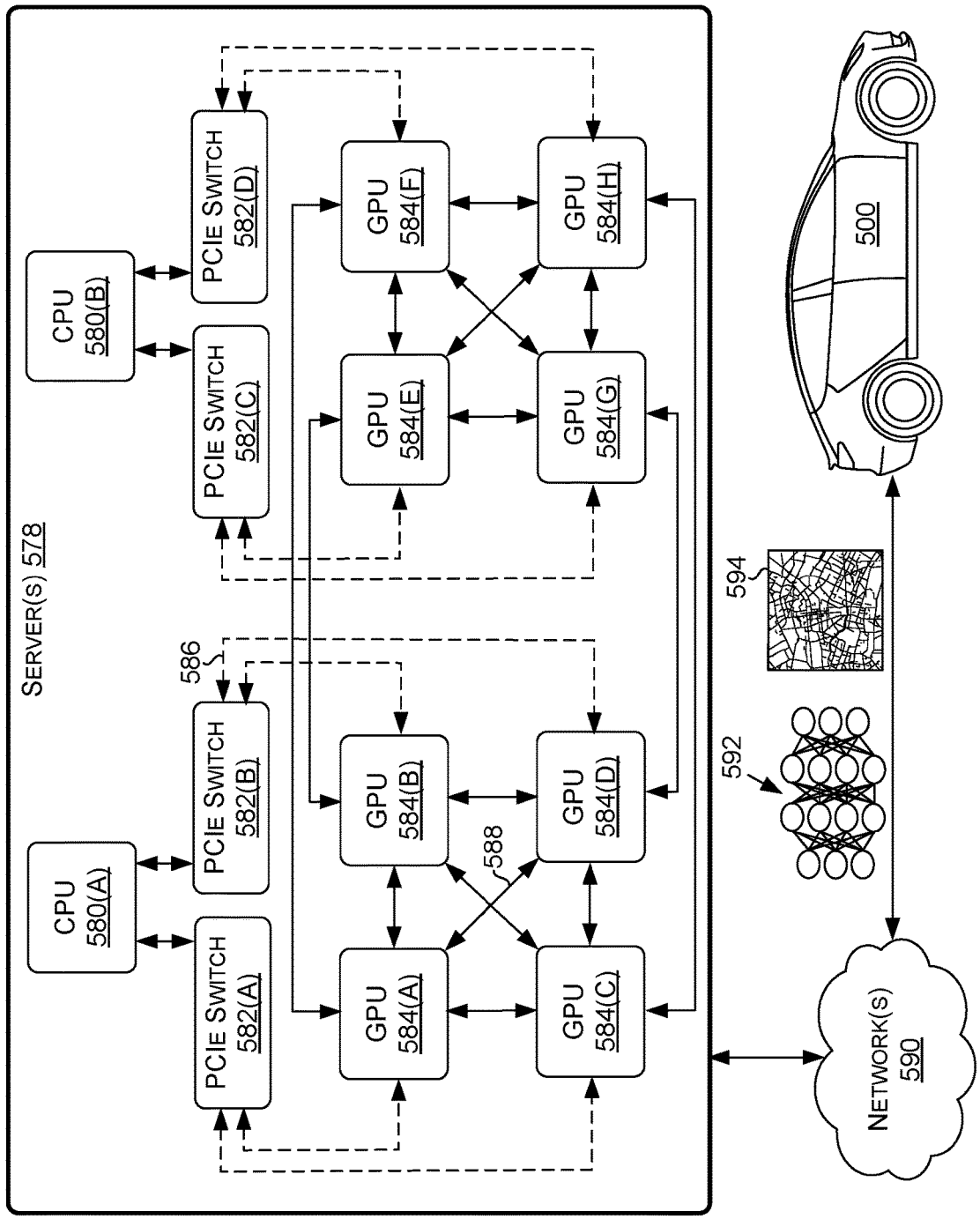
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
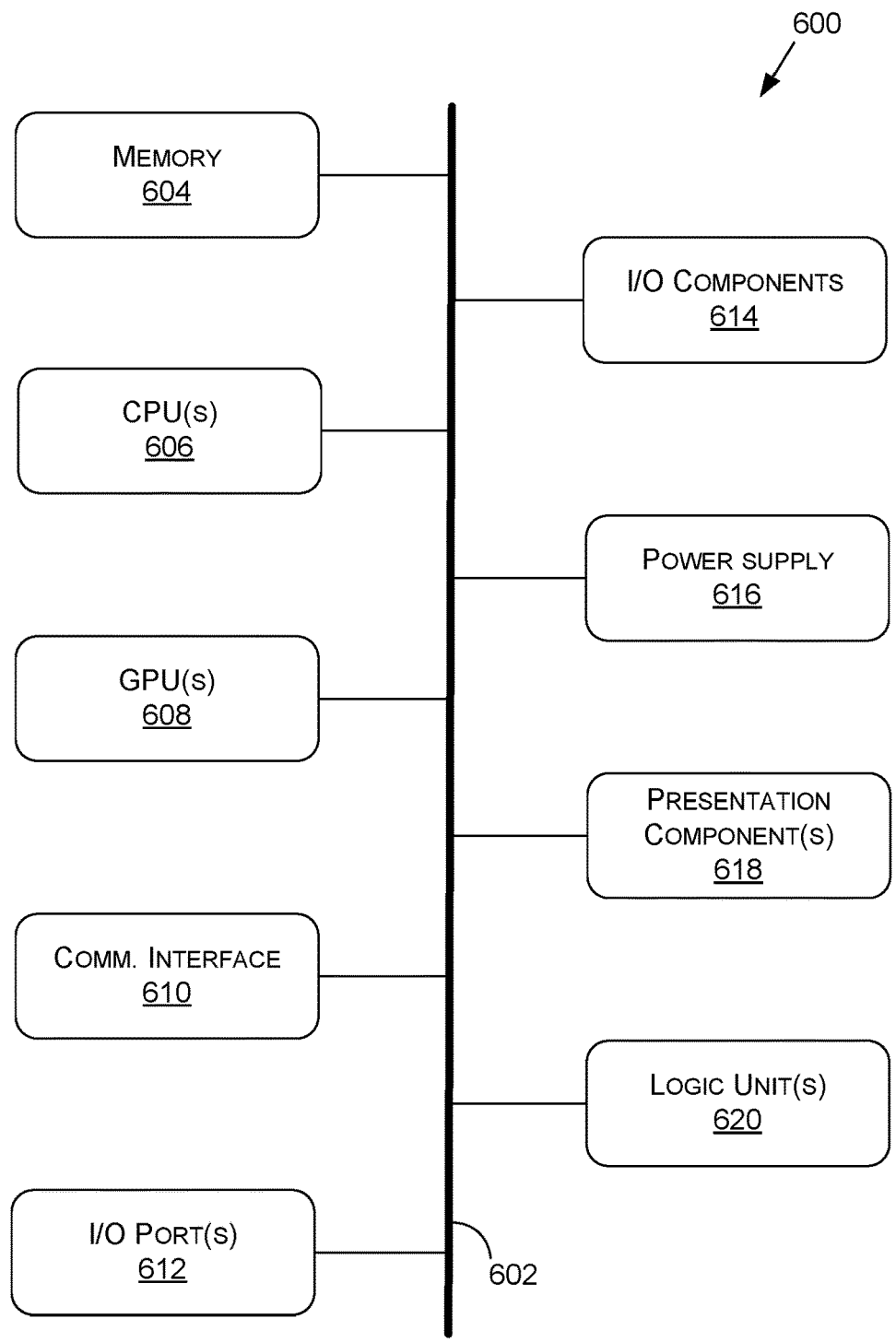
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 606, GPU(s) 608, and/or logic unit(s) 620 are configured to execute one or more instances of processing engine 122 and/or analysis engine 124. Statistics 210 and 212, aggregated statistics 222, posterior probabilities 224, and/or metrics 226 generated by processing engine 122 and/or analysis engine 124 can then be used to monitor the performance of various sensors and perform additional processing based on the performance of the sensors.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
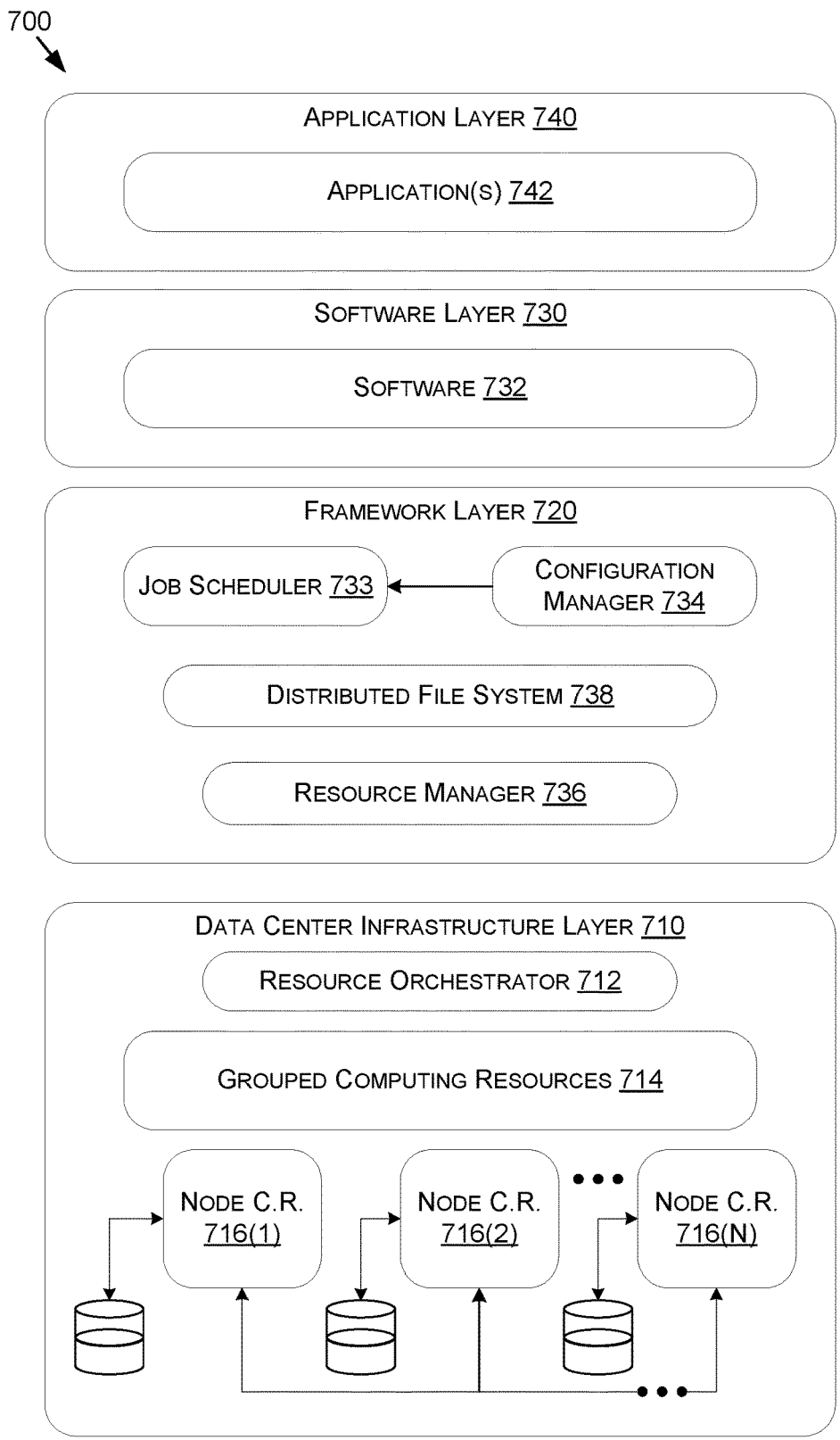
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques relate to a real-time secure solution for protecting Controller Area Network (CAN) messages in vehicles. The techniques described herein include receiving, by a cryptographic engine implemented on an electronic control unit (ECU), a message from an application to be transmitted over a CAN bus. The techniques also include accessing one or more keys from a secure memory associated with the cryptographic engine and computing an authentication tag using the one or more keys. The techniques further include transmitting the message with the authentication tag over the CAN bus to a destination address, wherein the authentication tag is used to confirm that the portion of the message has not changed during the transmitting.

To prioritize performance-critical workloads, a secure firmware executing on the cryptographic engine receives workloads from multiple software queues with different levels of priority, such as high and low priority queues in the case of two software queues. Applications are responsible for assigning their respective workloads to the appropriate queue before initiating a cryptographic authentication tag calculation. The secure firmware then processes the queues in a prioritized fashion, starting with the higher priority queue and sequentially moving to the lower priority queue, ensuring efficient and timely execution of critical tasks. To avoid lower priority queue workloads from stalling higher priority work, a quantization technique is employed by the secure firmware where low priority messages above a certain threshold size are split into smaller quantum operations of fixed sizes or smaller message packet. After operating on each discrete message packet associated with low priority work, the firmware is configured to perform a check to determine if higher priority workload is available for processing. If higher priority work is present, the higher priority work is completed before returning to the previous operation associated with the next discrete message packet associated with lower priority work. This bounds the amount of time the firmware spends operating on a low priority request and avoids interference with high priority requests.

One technical advantage of the disclosed techniques relative to the prior art is the ability to secure communication on a CAN bus network without requiring specialized hardware or needing to rewire or alter the CAN bus protocol in any fashion. Accordingly, the disclosed techniques are less resource-intensive than prior art approaches to secure communication. Another technical advantage of the disclosed techniques is the ability to secure and transmit high-priority messages before relatively lower priority messages, which allows messages associated with safety critical applications to be prioritized above other messages. Accordingly, the disclosed techniques can intelligently triage between different types of messages. Another technical advantage of the disclosed techniques is the enhanced security provided by using a dedicated security processor and associated memory for managing keys and computing authentication tags. This dedicated processor and memory ensure robust security measures, effectively safeguarding the CAN messaging network from potential hijacking or unauthorized access.

1. According to some embodiments a method comprises receiving, using a cryptographic engine, a message from an application to be transmitted over a CAN (Controller Area Network) bus, the cryptographic engine being implemented on an on-die discrete processor and executing a secure firmware; accessing, using the secure firmware, a key from a plurality of keys associated with an authentication process from a secure memory associated with the cryptographic engine; computing an authentication tag using the key and the message; and transmitting the message with the authentication tag over the CAN bus to a destination address.

2. The method according to clause 1, wherein the secure memory comprises an on-die SRAM.

3. The method according to clauses 1-2, wherein the on-die SRAM and the on-die discrete processor are part of a system on a chip (SOC) implemented on an electronic control unit (ECU) configured to perform a specific function within a vehicle.

4. The method according to clauses 1-3, wherein the plurality of keys associated with the authentication process are stored in a linear array in the secure memory.

5. The method according to clauses 1-4, further comprising accessing a high priority queue to determine whether one or more high priority messages are available for transmission; and responsive to a determination that one or more high priority messages are available for transmission, accessing the message from the high priority queue.

6. The method according to clauses 1-5, further comprising accessing a high priority queue to determine whether one or more high priority messages are available for transmission; and responsive to a determination that no high priority messages are available in the high priority queue, accessing a low priority queue to determine whether one or more low priority messages are available for transmission; and responsive to a determination that one or more low priority messages are available for transmission, accessing the message from the low priority queue.

7. The method according to clauses 1-6, wherein the accessing the message from the low priority queue comprises accessing the message in discrete packets, wherein the authentication tag is computed, at least in part, by separately computing a respective authentication tag for individual discrete packets in separate time intervals, and wherein individual respective authentication tags are computed subsequent to a determination that no high priority messages are available for processing in the high priority queue.

8. The method according to clauses 1-7, wherein the cryptographic engine comprises one or more hardware accelerators for computing the authentication tag.

9. According to some embodiments, a processor comprises one or more processing units to perform operations comprising receiving, using a cryptographic engine, a message and a first authentication tag over a CAN (Controller Area Network) bus; accessing a key from a plurality of keys associated with an authentication process from a memory associated with the cryptographic engine; computing a second authentication tag using the key and the message; and responsive to a determination that the first authentication tag is equivalent to the second authentication tag, authenticating the message.

10. The processor according to clause 9, wherein the key is accessed from an on-die memory.

11. The processor according to clauses 9-10, wherein the on-die memory includes an SRAM and the one or more processing units include one or more on-die discrete processing units, and further wherein the SRAM and the one or more on-die discrete processing units are part of a system on a chip (SOC) implemented on an electronic control unit (ECU) configured to perform a specific function within a vehicle.

12. The processor according to clauses 9-11, wherein the plurality of keys associated with the authentication process are stored in a linear array in the memory.

13. The processor according to clauses 9-12, wherein the one or more processing units comprise dedicated boot software for loading the secure firmware upon initialization 14. The processor according to clauses 9-13, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implementing one or more language models; a system for generating synthetic data; a system incorporating one or more virtual machines (VMs); a system implemented at least partially in a data center; or a system implemented at least partially using cloud computing resources.

15. According to some embodiments, a system comprises one or more processing units to perform operations comprising receiving, using a cryptographic engine, a message associated with a transmission over a CAN (Controller Area Network) bus; accessing a key from a plurality of keys associated with an authentication process from a secure memory associated with the cryptographic engine; and computing an authentication tag using the key and the message.

16. The system according to clause 15, further comprising comparing the authentication tag with a previously received authentication tag from a transmitting ECU; and responsive to a determination that the authentication tag is equivalent to the previously received authentication tag, authenticating the message.

17. The system according to clauses 15-16, further comprising transmitting the message with the authentication tag over the CAN bus to a destination address.

18. The system according to clauses 15-17, wherein the authentication process is selected from a group including HMAC (Hash-based MAC), KMAC (Keccak-based MAC), and CMAC (Cipher-based MAC).

19. The system according to clauses 15-18, wherein the receiving the message comprises: determining whether a high priority queue contains one or more messages to be authenticated; and one of: when the high priority queue contains one or more messages, accessing the message from the high priority queue; or when the high priority queue does not contain one or more messages to be authenticated, accessing the message from a low priority queue.

20. The system according to clauses 15-19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implementing one or more language models; a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   receiving, using a cryptographic engine, a message from an application to be transmitted over a CAN (Controller Area Network) bus, the cryptographic engine being implemented on an on-die discrete processor and executing a secure firmware;
   partitioning the message into a plurality of discrete packets based at least on the message being lower priority relative to other messages to be transmitted over the CAN;
   accessing, using the secure firmware, a key from a plurality of keys associated with an authentication process from a secure memory associated with the cryptographic engine;
   computing an authentication tag using the key and the message, the authentication tag being computed, at least in part, by separately computing a respective authentication tag for individual discrete packets in separate time intervals, where individual respective authentication tags are computed subsequent to a determination that a higher priority message relative to the message is not available for processing by the cryptographic engine; and
   transmitting the message with the authentication tag over the CAN bus to a destination address.

2. The method of claim 1, wherein the secure memory comprises an on-die SRAM.

3. The method of claim 2, wherein the on-die SRAM and the on-die discrete processor are part of a system on a chip (SOC) implemented on an electronic control unit (ECU) configured to perform a specific function within a vehicle.

4. The method of claim 1, wherein the plurality of keys associated with the authentication process are stored in a linear array in the secure memory.

5. The method of claim 1, further comprising:
   accessing a high priority queue to determine whether one or more high priority messages are available for transmission; and
   responsive to a determination that one or more high priority messages are available for transmission, accessing the message from the high priority queue.

6. The method of claim 1, further comprising:
   accessing a high priority queue to determine whether one or more high priority messages are available for transmission;
   responsive to a determination that no high priority messages are available in the high priority queue, accessing a low priority queue to determine whether one or more low priority messages are available for transmission; and
   responsive to a determination that one or more low priority messages are available for transmission, accessing the message from the low priority queue.

7. The method of claim 1, wherein the cryptographic engine comprises one or more hardware accelerators for computing the authentication tag.

8. A processor comprising:
   one or more processing units to perform operations comprising:
      receiving, using a cryptographic engine, a message and a first authentication tag over a CAN (Controller Area Network) bus;
      partitioning the message into a plurality of discrete packets based at least on the message being lower priority relative to other messages to be transmitted over the CAN;
      accessing a key from a plurality of keys associated with an authentication process from a memory associated with the cryptographic engine;
      computing a second authentication tag using the key and the message, the authentication tag being computed, at least in part, by separately computing a respective authentication tag for individual discrete packets in separate time intervals, where individual respective authentication tags are computed subsequent to a determination that a higher priority message relative to the message is not available for processing by the cryptographic engine; and
      responsive to a determination that the first authentication tag is equivalent to the second authentication tag, authenticating the message.

9. The processor of claim 8, wherein the key is accessed from an on-die memory.

10. The processor of claim 9, wherein the on-die memory includes an SRAM and the one or more processing units include one or more on-die discrete processing units, and further wherein the SRAM and the one or more on-die discrete processing units are part of a system on a chip (SOC) implemented on an electronic control unit (ECU) configured to perform a specific function within a vehicle.

11. The processor of claim 8, wherein the plurality of keys associated with the authentication process are stored in a linear array in the memory.

12. The processor of claim 8, wherein the one or more processing units comprise dedicated boot software for loading secure firmware upon initialization.

13. The processor of claim 8, wherein the processor is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system for generating or presenting at least one of virtual reality content, augmented reality content, or mixed reality content;
- a system implemented using a robot;
- a system for performing conversational AI operations;
- a system implementing one or more language models;a system for generating synthetic data;
- a system incorporating one or more virtual machines (VMs);
- a system implemented at least partially in a data center; or
- a system implemented at least partially using cloud computing resources.

14. A system comprising:
one or more processing units to perform operations comprising:
  receiving, using a cryptographic engine, a message associated with a transmission over a CAN (Controller Area Network) bus;
  partitioning the message into a plurality of discrete packets based at least on the message being lower priority relative to other messages to be transmitted over the CAN;
  accessing a key from a plurality of keys associated with an authentication process from a secure memory associated with the cryptographic engine; and
  computing an authentication tag using the key and the message, the authentication tag being computed, at least in part, by separately computing a respective authentication tag for individual discrete packets in separate time intervals, where individual respective authentication tags are computed subsequent to a determination that a higher priority message relative to the message is not available for processing by the cryptographic engine.

15. The system of claim 14, further comprising:
comparing the authentication tag with a previously received authentication tag from a transmitting ECU; and
responsive to a determination that the authentication tag is equivalent to the previously received authentication tag, authenticating the message.

16. The system of claim 14, further comprising:
transmitting the message with the authentication tag over the CAN bus to a destination address.

17. The system of claim 14, wherein the authentication process is selected from a group including HMAC (Hash-based MAC), KMAC (Keccak-based MAC), and CMAC (Cipher-based MAC).

18. The system of claim 14, wherein the receiving the message comprises:
determining whether a high priority queue contains one or more messages to be authenticated; and
one of:
  when the high priority queue contains one or more messages, accessing the message from the high priority queue; or
  when the high priority queue does not contain one or more messages to be authenticated, accessing the message from a low priority queue.

19. The system of claim 14, wherein the system is comprised in at least one of:
- a control system for an autonomous or semi-autonomous machine;
- a perception system for an autonomous or semi-autonomous machine;
- a system for performing simulation operations;
- a system for performing digital twin operations;
- a system for performing light transport simulation;
- a system for performing collaborative content creation for 3D assets;
- a system for performing deep learning operations;
- a system implemented using an edge device;
- a system for generating or presenting at least one of virtual reality content, augmented reality content, or mixed reality content;
- a system implemented using a robot;
- a system for performing conversational AI operations;
- a system implementing one or more language models;
- a system for generating synthetic data;
- a system incorporating one or more virtual machines (VMs);
- a system implemented at least partially in a data center; or
- a system implemented at least partially using cloud computing resources.

* * * * *